United States Patent
Liu et al.

(10) Patent No.: US 10,042,462 B2
(45) Date of Patent: Aug. 7, 2018

(54) ELECTRONIC APPARATUS AND MODE CONTROL METHOD AND TOUCH SENSING METHOD THEREOF

(71) Applicant: MStar Semiconductor, Inc., Hsinchu Hsien (TW)

(72) Inventors: Chi Kang Liu, Chupei (TW); Chien Chuan Chen, Chupei (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 306 days.

(21) Appl. No.: 14/956,572

(22) Filed: Dec. 2, 2015

(65) Prior Publication Data

US 2016/0231851 A1    Aug. 11, 2016

(30) Foreign Application Priority Data

Feb. 11, 2015    (TW) .............................. 104104588 A

(51) Int. Cl.
*G06F 3/044* (2006.01)
*G06F 3/041* (2006.01)

(52) U.S. Cl.
CPC ............ *G06F 3/0416* (2013.01); *G06F 3/044* (2013.01)

(58) Field of Classification Search
CPC ................ G06F 3/044; G06F 3/0416
See application file for complete search history.

(56) References Cited

U.S. PATENT DOCUMENTS

| 8,502,800 | B1* | 8/2013 | Vier | ...................... G06F 3/0416 |
| | | | | 345/169 |
| 2010/0013778 | A1* | 1/2010 | Liu | ........................ G06F 1/1626 |
| | | | | 345/173 |
| 2010/0194682 | A1* | 8/2010 | Orr | ...................... G06F 3/04886 |
| | | | | 345/156 |
| 2013/0176254 | A1* | 7/2013 | Lee | .......................... G06F 3/041 |
| | | | | 345/173 |

(Continued)

FOREIGN PATENT DOCUMENTS

| CN | 101526873 A | 9/2009 |
| CN | 104049744 A | 9/2014 |
| JP | 2012194791 A | 10/2012 |

OTHER PUBLICATIONS

Taiwan Office Action, dated Apr. 24, 2018, 10 pages.

*Primary Examiner* — Kumar Patel
*Assistant Examiner* — Amy C Onyekaba
(74) *Attorney, Agent, or Firm* — Edell, Shapiro & Finnan, LLC

(57) ABSTRACT

A touch sensing method of an electronic apparatus is provided. The electronic device includes a touch sensor and a motion sensor. The touch sensing method includes: performing touch detection with the touch sensor to generate a touch signal having a first amplitude; performing motion detection with the motion sensor to generate a motion signal having a second amplitude; determining whether the first amplitude is smaller than a first predetermined value, and determining whether the second amplitude is greater than a second predetermined value; and when the first amplitude is smaller than the first predetermined value and the second amplitude is greater than the second predetermined value, increasing a signal gain corresponding to the touch signal.

9 Claims, 11 Drawing Sheets

(56) References Cited

U.S. PATENT DOCUMENTS

| | | | | |
|---|---|---|---|---|
| 2013/0328616 A1* | 12/2013 | Buttolo | ............... | H03K 17/955 327/517 |
| 2013/0328828 A1* | 12/2013 | Tate | ....................... | G06F 3/044 345/174 |
| 2014/0002340 A1* | 1/2014 | Jordan | ................. | G06F 3/0416 345/156 |
| 2014/0176447 A1* | 6/2014 | Alameh | ................. | G06F 3/044 345/173 |
| 2014/0267085 A1* | 9/2014 | Li | .......................... | G06F 3/041 345/173 |
| 2014/0320429 A1* | 10/2014 | Takano | ................ | G06F 1/1694 345/173 |
| 2014/0354574 A1* | 12/2014 | Hirabayashi | ........... | G06F 3/041 345/173 |
| 2016/0124576 A1* | 5/2016 | Besshi | ................ | G06F 3/0416 345/174 |

* cited by examiner

ELECTRONIC APPARATUS AND MODE CONTROL METHOD AND TOUCH SENSING METHOD THEREOF

This application claims the benefit of Taiwan application Serial No. 104104588, filed Feb. 11, 2015, the subject matter of which is incorporated herein by reference.

BACKGROUND OF THE INVENTION

Field of the Invention

The invention relates in general to an electronic apparatus, and a mode control method and a touch sensing method thereof, and more particularly to an electronic apparatus capable of detecting a touch of a finger wearing a glove, and a mode control method and a touch sensing method thereof.

Description of the Related Art

Based on sensing principles, touch electronic apparatuses may be generally categorized into resistive, capacitive, ultrasonic, optical (infrared) types. Conventional capacitive touch control, featuring high optical transmittance, a fast response speed and a multi-touch capability, is gradually replacing resistive touch control. In capacitive touch control, the object to be detected needs to have static electric charges that cause a capacitance change in the electronic apparatus, and a position of the object is determined through detecting the capacitance change in the electronic apparatus.

However, conventional capacitive touch control has limitations regarding signal recognition of the capacitance change, and is capable of only detecting an object that generates a certain capacitance change. For example, a touch point applied by a finger of a user can be detected. As such, when an object does not cause the capacitance of an electronic apparatus to change significantly enough, the object cannot be detected by the electronic apparatus. More particularly, when fingers of a user wear a glove, the electronic device may fail to detect a touch of such fingers for that the capacitance change is beyond the recognition range of the capacitance change of the electronic apparatus. Consequently, the user is required to remove the glove in order to perform touch control, resulting in user inconvenience.

SUMMARY OF THE INVENTION

It is a primary object of the present invention to provide an electronic apparatus and a mode control method and a touch sensing method thereof, so as to allow an electronic apparatus to recognize a bare finger and a finger wearing a glove to further perform a touch function, thereby eliminating the inconvenience of having to remove the glove for a user.

To achieve the above object, the present invention provides a touch sensing method of an electronic apparatus. The electronic apparatus includes a touch sensor and a motion sensor. The touch sensing method includes following steps. Touch detection is performed with the touch sensor to generate at least a first touch signal, and motion detection is performed with the motion sensor to generate at least a first motion signal. The first touch signal has a first amplitude, and the first motion signal has a second amplitude. It is determined whether the first amplitude is smaller than a first predetermined value, and it is determined whether the second amplitude is greater than a second predetermined value. When the first amplitude is smaller than the first predetermined value and the second amplitude is greater than the second predetermined value, a signal gain corresponding to the first touch signal is increased.

To achieve the above object, the present invention further provides a mode control method of an electronic apparatus. The electronic apparatus includes a touch sensor and a motion sensor. The mode control method includes following steps. Touch detection is performed with the touch sensor to generate a touch signal, and motion detection is performed with the motion sensor to generate a motion signal. According to the touch signal and the motion signal, the electronic apparatus is switched to one of a first mode and a second mode. The first mode and the second mode correspond to a first signal gain and a second signal gain, respectively, and the first signal gain and the second signal gain are for adjusting the touch signal.

To achieve the above object, the present invention further provides an electronic apparatus. The electronic apparatus includes: a touch sensor that performs touch detection to generate a first touch signal; a motion sensor that performs motion detection to generate a first motion signal; a signal amplifying unit that performs signal amplification on the first touch signal according to a signal gain; and a controller configured to adjust the signal gain according to the amplified first touch signal and the first motion signal.

In the touch sensing method of the present invention, the electronic apparatus simultaneously utilizes the touch sensor and the motion sensor to determine whether a touch object is a bare finger or a finger wearing a glove, so that the electronic apparatus is capable of adjusting the signal gain of the touch sensor for different touch objects. Accordingly, when the electronic apparatus is incapable of detecting a finger wearing a glove, the electronic apparatus may increase the signal gain to further eliminate the inconvenience of having to remove the glove for the user.

The above and other aspects of the invention will become better understood with regard to the following detailed description of the preferred but non-limiting embodiments. The following description is made with reference to the accompanying drawings.

DETAILED DESCRIPTION OF THE INVENTION

In the present invention, an electronic apparatus at least includes a touch sensor and a motion sensor. The touch sensor may be applied to perform touch detection on a touch object, e.g., a bare user finger or a user finger wearing a glove, to generate a touch signal. The motion sensor may be applied to perform motion detection on the electronic apparatus to generate a motion signal.

Figure 1:
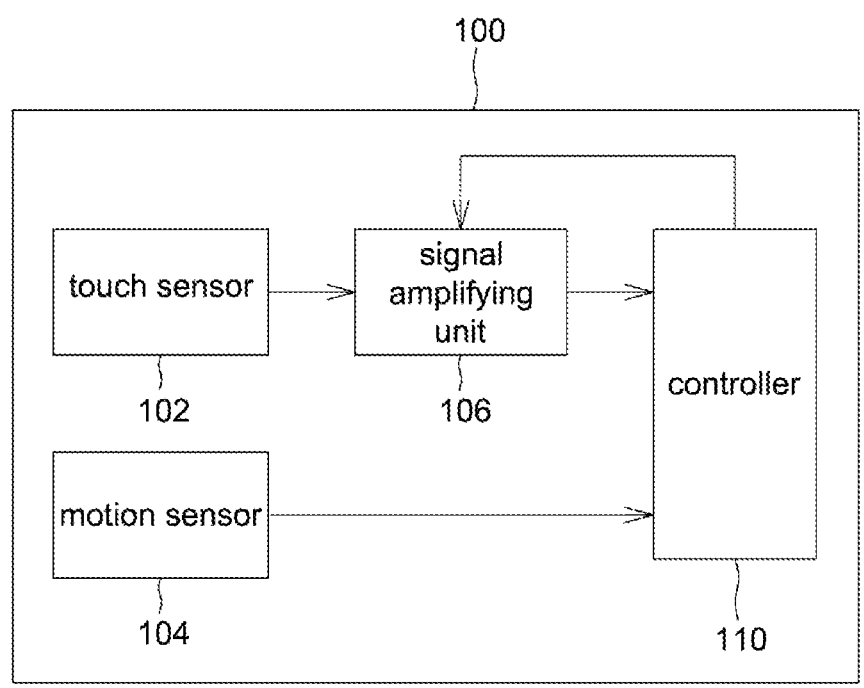
FIG. 1 is a block diagram of an electronic apparatus according to an embodiment of the present invention.

In the description below, preferred embodiments of an electronic apparatus of the present invention are given as examples for illustration purposes. Referring to FIG. 1, in the embodiment, in addition to a touch sensor 102 and a motion sensor 104, an electronic apparatus 100 further includes a signal amplifying unit 106 and a controller 110. The signal amplifying unit 106 may be applied to perform signal amplification on a touch signal sensed by the touch sensor 102 by using a signal gain, so that the amplified touch signal satisfies a recognition range of the controller 110 to assist in signal determination of the touch signal. Further, the controller 110 may adjust the signal gain according to the amplified touch signal and the motion signal to switch the electronic apparatus 100 between a first mode and a second mode. When the electronic apparatus 100 is incapable of detecting a finger wearing a glove, the electronic apparatus 100 may increase the signal gain; when the electronic apparatus 100 is incapable of detecting a bare finger, the electronic apparatus 100 may reduce the signal gain, thereby eliminating the inconvenience of having to remove the glove for the user.

More specifically, in the embodiment, the controller 110 of the electronic apparatus 100 may respectively receive a touch signal and a motion signal to perform calculation and determination. In another embodiment, the controller 110 may be implemented by an independent touch controller and an independent motion controller. In the embodiment, for example, the touch sensor 102 of the electronic apparatus 100 may be a capacitive touch sensor, a resistive touch sensor or a magnetic touch sensor of a touch panel. The touch sensor 102 senses a touch of an object, generates a touch signal, and outputs the generated touch signal to the signal amplifying unit 106, so that an amplitude of the amplified touch signal satisfies a recognition range of the controller 110. The controller 110 then performs calculation and signal determination on the received touch signal to learn whether a touch event occurs on the electronic apparatus 100 and to determine a position of the touch position. Further, the signal gain of the signal amplifying unit 106 may be adjusted through the controller 110. Further, the motion signal generated by the motion sensor 104 can be calculated through the controller 110 to learn whether the electronic apparatus 100 is in motion and a magnitude of the motion of the electronic apparatus 100 on coordinate axes.

Figure 2:
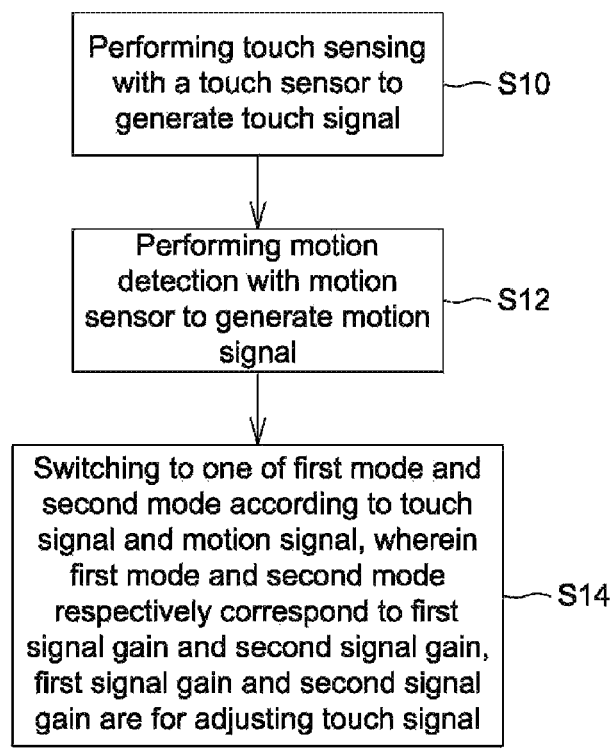
FIG. 2 is a flowchart of a mode control method of an electronic apparatus according to an embodiment of the present invention.

Referring to FIG. 2, a mode control method of the electronic apparatus 100 provided by the present invention includes following steps.

In step S10, touch detection is performed with the touch sensor 102 to generate a touch signal.

In step S12, motion detection is performed with the motion sensor 104 to generate a motion signal.

In step S14, according to the touch signal and the motion signal, the electronic apparatus 100 is switched to one of a first mode and a second mode. The first mode and the second mode correspond to a first signal gain and a second signal gain, respectively, and the first signal gain and the second signal gain are for adjusting the touch signal.

Figure 3:
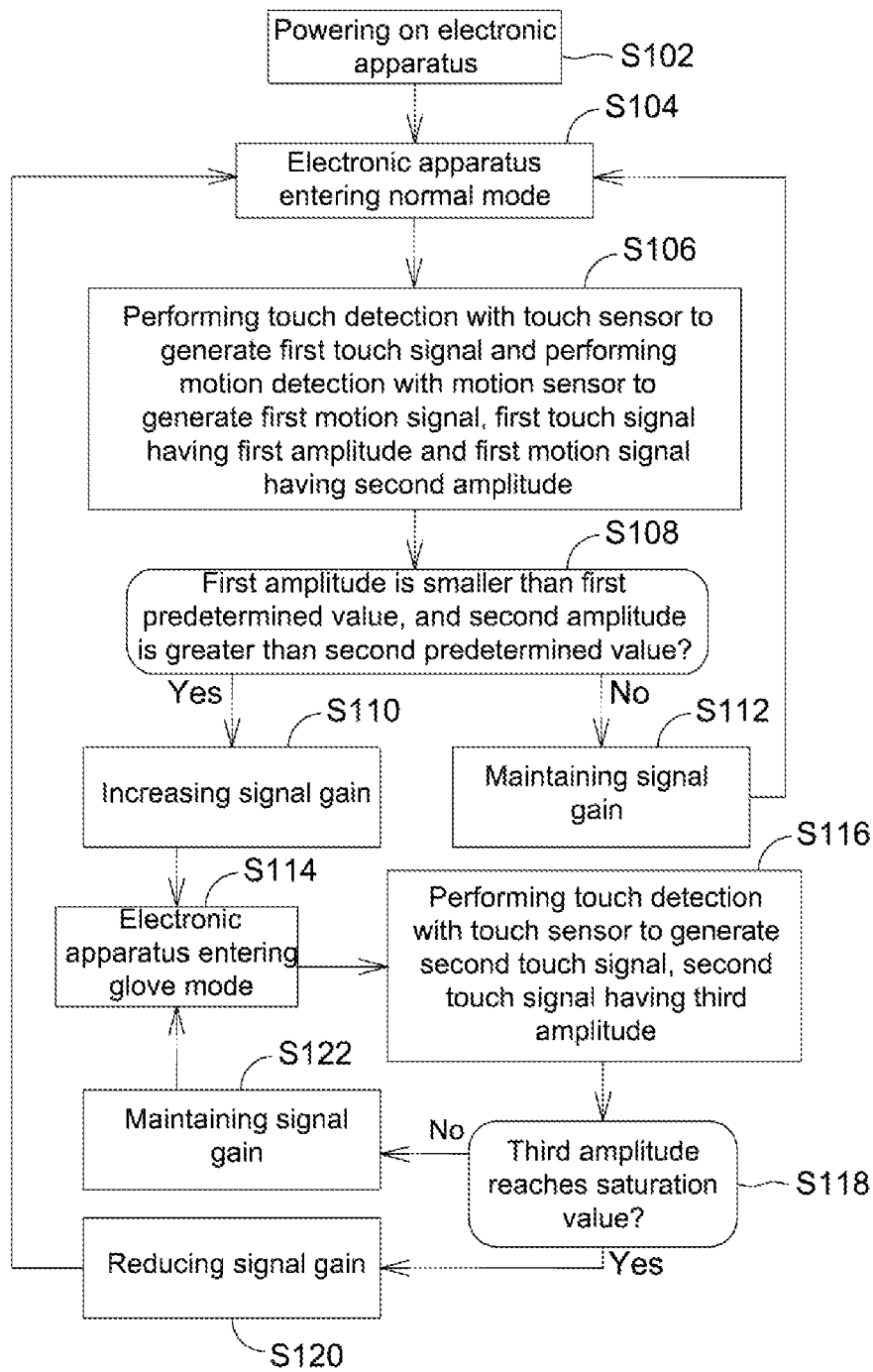
FIG. 3 is a flowchart of a touch sensing method of an electronic apparatus according to an embodiment of the present invention.
Figure 4:
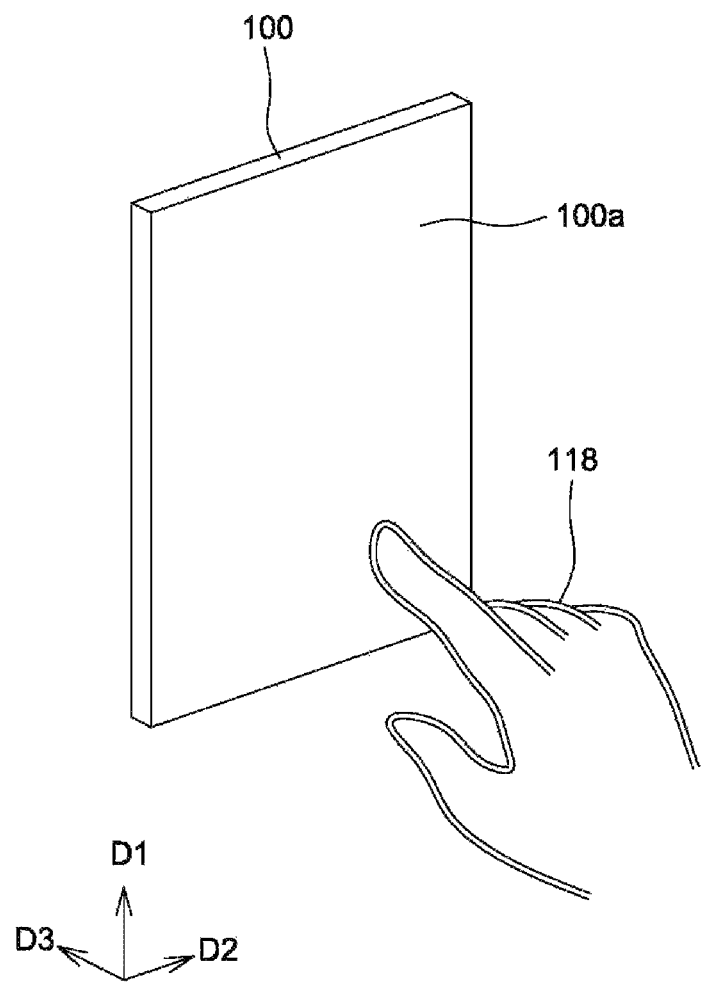
FIG. 4 is a schematic diagram of a first touch object touching an electronic apparatus of the present invention.

Through the above mode control method, the present invention further provides a touch sensing method of the electronic apparatus 100. In the description below, for example, a first touch object is exemplified by a user finger wearing a glove. Further, the first mode corresponds to a normal mode below, and the second mode corresponds to a glove mode below. Referring to FIG. 3 and FIG. 4 as well as FIG. 1, the touch sensing method of the embodiment includes following steps.

In step S102, the electronic apparatus 100 is powered on.

In step S104, the electronic apparatus 100 enters a normal mode.

In step S106, touch detection is performed with the touch sensor 102 to generate a first touch signal, and motion detection is performed with the motion sensor 104 to generate a first motion signal. The first touch signal has a first amplitude, and the first motion signal has a second amplitude.

In step S108, it is determined whether the first amplitude is smaller than a first predetermined value, and it is determined whether the second amplitude is greater than a second predetermined value. When the first amplitude is smaller than the first predetermined value and the second amplitude is greater than the second predetermined value, step S110 is performed, or else step S112 is performed.

In step S110, a signal gain corresponding to the first touch signal is increased.

In step S112, the signal gain corresponding to the first touch signal is maintained.

In step S114, the electronic apparatus enters a glove mode.

More specifically, step S102 is first performed. In step S102, the user may power on the electronic apparatus 10 through a switch to cause the electronic apparatus 100 to start operating. In step S104, the electronic apparatus 100 is defaulted to enter the normal mode after being powered on. At this point, the signal gain of the signal amplifying unit 106 may be defaulted to a first signal gain. In the embodiment, when the user applies a touch using the touch object, the controller 110 in the normal mode is capable of recognizing the touch signal that is generated by the touch sensor 102 and amplified by the signal amplifying unit 106. For example, the touch object may be a bare finger, a stylus or another object capable of generating a signal change. In another embodiment, the electronic apparatus 100 may also enter other modes after being powered on.

Figure 5:
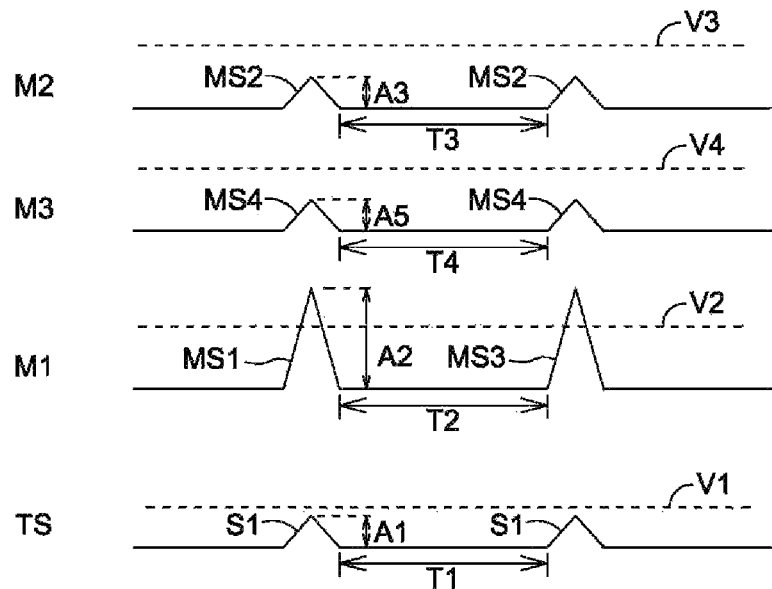
FIG. 5 is a schematic diagram of a touch signal, a first motion signal, a second motion signal and a third motion signal of conditions in step S110 according to a first embodiment of the present invention.

Refer to FIG. 5 as well as FIG. 1 to FIG. 4. In step S106, the user touches the electronic apparatus 100 at least once with a first touch object 118. Accordingly, the electronic apparatus 100 utilizes the touch sensor 102 to generate a touch signal TS, which at least includes a first touch signal S1. In the embodiment, the electronic apparatus 100 is disposed in a three-dimensional space formed by a first direction D1, a second direction D2 and a third direction D3 perpendicular to one another, and the motion sensor 104 may perform motion detection on the electronic apparatus 100 in the first direction D1, the second direction D2 and the third direction D3. The electronic apparatus 100 comprises a touch surface 100a perpendicular to the third direction D3. When the first touch object 118 touches the touch surface 100a of the electronic apparatus 100, the electronic apparatus 100 moves in the third direction D3, so that the motion sensor 104 accordingly generate a motion signal M1. The motion signal M1 includes a first motion signal MS1, and is associated with a motion in the third direction D3 perpendicular to the touch surface 100a. Meanwhile, the motion sensor 104 may detect a motion in a direction parallel to the touch surface 100a to generate a motion signal corresponding to the direction parallel to the touch surface 100a. In the embodiment, the motion sensor 104 may detect the motion of the electronic apparatus 100 in the first direction D1 parallel to the touch surface 100a and in the second direction D2, so as to generate a motion signal M2 associated with the motion in the first direction D1 and a motion signal M3 associated with the motion in the second direction D2. The motion signal M2 includes at least one second motion signal MS2, and the motion signal M3 includes at least one fourth motion signal MS4.

In the embodiment, for example, the user touches the electronic apparatus 100 twice with the first touch object 118. Through the motion of two clicks, the touch sensor 102 generates two first touch signals S1 each having a first amplitude A1. It should be noted that the first touch signals S1 having first amplitude A1 have been amplified by the signal amplifying unit 106. The first amplitudes A1 of the two first touch signals S1 may be the same or different, depending on a level of each touch of the first touch object 118. For example, the touch level depends on a contact area between the first touch object 118 and the electronic apparatus 100, and the corresponding signal gain of the signal amplifying unit 106. Further, the motion sensor 104 may generate the first motion signal MS1 and the third motion signal MS3 in the third direction, two second motion signals MS2 in the first direction D1, and two fourth motion signals MS4 in the second direction D2. The first motion signal MS1 and the third motion signal MS3 may each have a second amplitude A2, the second motion signals MS2 may each have a third amplitude A3, and the fourth motion signals MS4 may each have a fifth amplitude A5. Similarly, the amplitudes of the first motion signal MS1 and the third motion signal MS3 may be the same or different, the third amplitude A3 may be the same or different, and the fifth amplitude A5 may be the same or different, depending on the amplitude of motion each time the first touch object 118 moves relative to the electronic apparatus 100, e.g., the magnitude of force of the first touch object 118 clicking on the electronic apparatus 100. As a time interval is present between the two clicks of the first touch object 118 on the electronic apparatus 100, the first touch signals S1 may have a first time interval T1, the first motion signal MS1 and the third motion signal MS3 may have a second time interval T2, the second motion signals MS2 may have a third time interval T3, and the fourth motion signals MS4 may have a fourth time interval T4. The first, second, third and fourth time intervals T1, T2, T3 and T4 are the same in this embodiment. It should be noted that, in another embodiment, the touch sensor 102 and the motion sensor 104 may periodically perform touch detection and motion detection according to predetermined time intervals. Under such circumstances, the foregoing time interval represents a time interval between two valid signals. For example, during an interval between the two touches of the first touch object 118 on the electronic apparatus 100, the electronic apparatus 100 may have performed a plural times of touch detection, and the interval between two first touch signals S1 correspondingly generated by two clicks is the first time interval.

In step S108, the first touch signal S1 is transmitted to the controller 110 to determine whether the first amplitude A1 is smaller than a first predetermined value V1 through the controller 110. Further, the first motion signal MS1 is transmitted to the controller 110 to determine whether the second amplitude A2 is greater than a predetermined second value V2 through the controller 110. For example, the first predetermined value V1 may be a minimum amplitude that allows the controller 110 to determine a touch event occurring at the electronic apparatus 100, and the second predetermined value V2 may be a minimum amplitude that allows the motion sensor 104 to determine a touch event occurring at the electronic apparatus 100 in the third direction D3. The first predetermined value V1 and the second predetermined value V2 of the present invention are not limited to the above examples. Further, the second motion signals MS2 and the fourth motion signals MS4 are also transmitted to the controller 110.

According to the determination result of the controller 110, when the first amplitude A1 is smaller than the first predetermined value V1 and the second amplitude A2 is greater than the second predetermined value V2, step S110 is performed. More specifically, through the comparison between the first amplitude A1 and the first predetermined value V1, it is learned whether the electronic apparatus 100 detects a position of the first touch object; through the comparison between the second amplitude A2 and the second predetermined value V2, it is learned whether a motion of the electronic apparatus 100 is generated due to the touch of the first touch object 118. Therefore, when the first amplitude A1 is smaller than the first predetermined value V1 and the second amplitude A2 is greater than the second predetermined value V2, although the electronic apparatus 100 is incapable of detecting the position of the first touch object 118, the electronic apparatus 100 may still learn the motion of the touch of the first touch object 118 through the value of the second amplitude A2. As known from above, according to the determination result, the electronic apparatus 100 may determine that the first touch object 118 is a user finger wearing a glove or another object causing a touch sensing signal that cannot be easily recognized by the controller 110.

Figure 6:
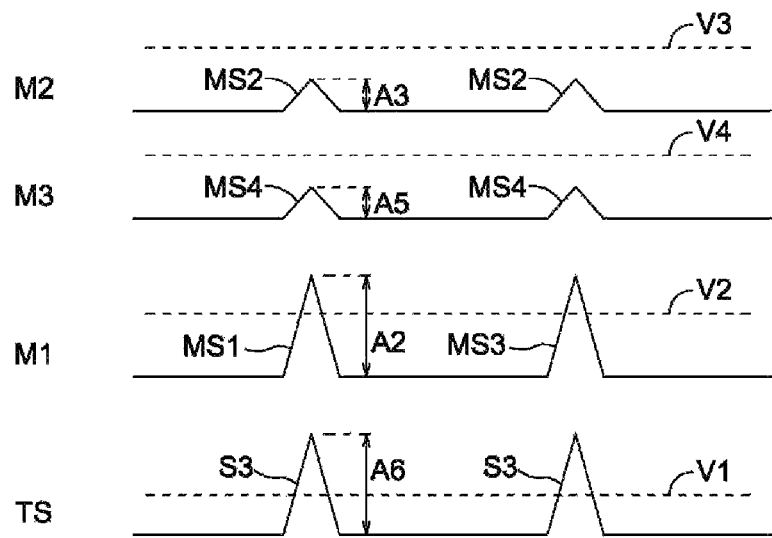
FIG. 6 is a schematic diagram of a touch signal, a first motion signal, a second motion signal and a third motion signal generated after step S110 in a touch sensing method according to the first embodiment of the present invention.

In Step S110, which is performed after the electronic apparatus 100 determines that the first touch object 118 may be a user finger wearing a glove, the signal gain of the signal amplifying unit 106 is increased through the controller 110. In step S114, the electronic apparatus 100 is caused to enter a glove mode. For example, the signal gain is increased from the first signal gain to a second signal gain greater than the first signal gain, i.e., the normal mode and the glove mode correspond to the first signal gain and the second signal gain, respectively. Accordingly, as shown in FIG. 6, when the first touch object 118 again touches the electronic apparatus 100, the touch sensor 102 may generate the third touch signal S3, which has a sixth amplitude A6, after amplified, greater than the first predetermined value V1. Further, the motion sensor 104 still generates the first motion signal MS1, the second motion signals MS2 and the fourth motion signals MS4, and the second amplitude A2 of the first motion signal is greater than the second predetermined value V2. Thus, the controller 110 first determines that the result is a touch event, and recognizes the third touch signal S3 generated from the first touch object 118 touching the touch sensor 102 to further detect the position of the first touch object 118, and determines that the first touch object 118 is a user finger wearing a glove.

Figure 7:
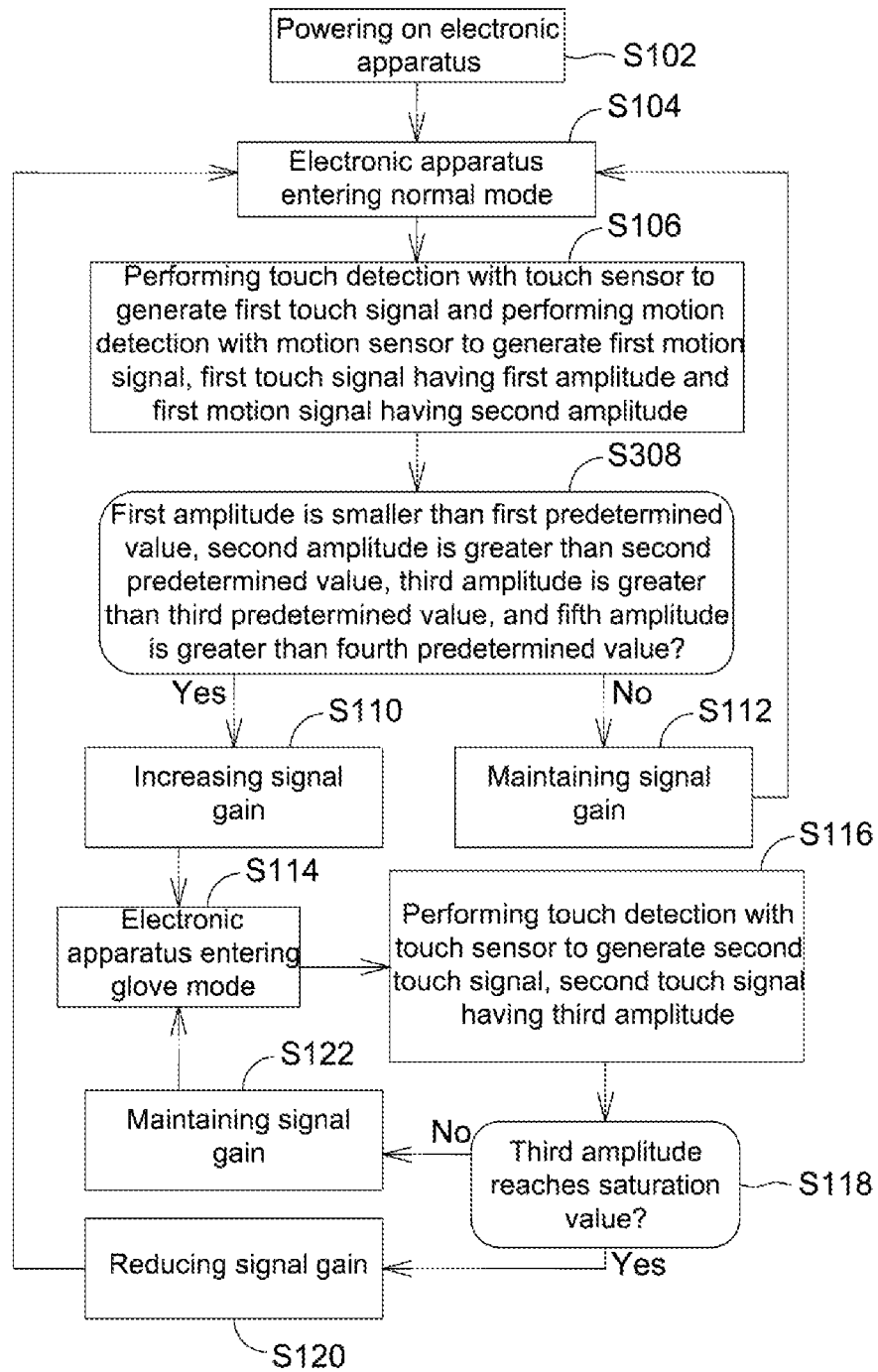
FIG. 7 is a variation of a touch sensing method of an electronic apparatus according to the first embodiment of the present invention.

In another embodiment, as shown in FIG. 7, step S108 may selectively include determining whether the third amplitude A3 is greater than a third predetermined value V3 and determining whether the fifth amplitude A5 is greater than a fourth predetermined value V4, i.e., step S308. The third predetermined value V3 is a predetermined maximum amplitude that is acceptable to the motion sensor 104 in the first direction D1 when a touch event is generated at the electronic apparatus 100, and the fourth predetermined value V4 is a predetermined maximum amplitude that is acceptable to the motion sensor 104 in the second direction D2 when a touch event is generated at the electronic apparatus 100. Thus, the electronic apparatus 100 determines that, under the conditions that the first amplitude A1 is smaller than the first predetermined value V1, the second amplitude A2 is greater than the second predetermined value V2, the third amplitude A3 is smaller than the third predetermined value V3, and the fifth amplitude A5 is smaller than the fourth predetermined value V4, the first touch object 118 is a user finger wearing a glove. Step S110 is then performed. As such, the electronic apparatus 100 is prevented from giving a misjudgment when a motion is present in all of the first direction D1, the second direction D2 and the third direction D3.

Figure 8:
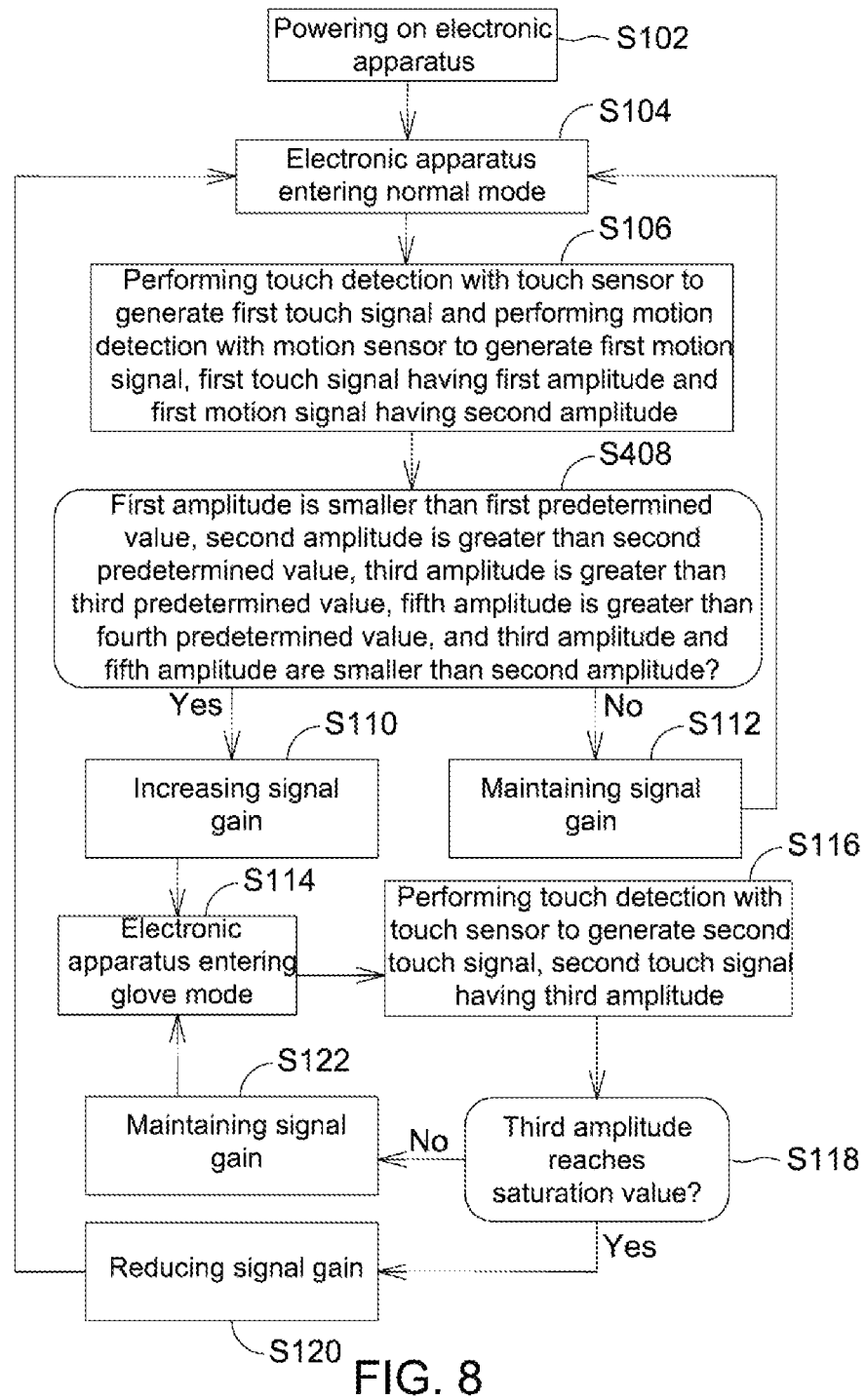
FIG. 8 is another variation of a touch sensing method of an electronic apparatus according to the first embodiment of the present invention.

In another embodiment, as shown in FIG. 8, step S108 may further include determining whether the third amplitude A3 and the fifth amplitude A5 are smaller than the second amplitude A2, i.e., step S408. Thus, the electronic apparatus 100 determines that, under the conditions that the first amplitude A1 is smaller than the first predetermined value V1, the second amplitude A2 is greater than the second predetermined value V2, the third amplitude A3 is smaller than the third predetermined value V3, the fifth amplitude A5 is smaller than the fourth predetermined value V4, and the third amplitude A3 and the fifth amplitude A5 are smaller than the second amplitude A2, the first touch object 118 is a user finger wearing a glove. Step S110 is then performed.

Figure 9:
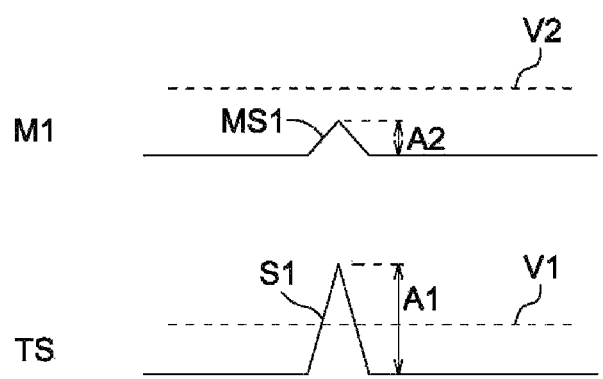
FIG. 9 is a schematic diagram of a touch signal and a first motion signal of conditions of step S112 according to the first embodiment of the present invention.

As shown in FIG. 1, FIG. 3 and FIG. 9, according to the determination result of the controller 110, when the first amplitude A1 is not smaller than (greater than or equal to) the first predetermined value V1, or the second amplitude A2 is not greater than (smaller than or equal to) the second predetermined value, step S112 is performed. Further, when the electronic apparatus 100 determines that the first amplitude A1 is greater than or equal to the first predetermined value V1, the electronic apparatus 100 is capable of detecting the position of the first touch object and hence determines that the first touch object is a bare user finger, for example. Thus, in step S112, the controller 110 maintains the signal gain of the signal amplifying unit 106. Step S104 is then performed, and the electronic apparatus 100 is maintained in the normal mode. More specifically, the signal gain is maintained as the first signal gain, so that the controller 110 may recognize the touch signal generated from a user bare finger touching the touch sensor 102.

Again referring to FIG. 1 and FIG. 3, the touch sensing method of the embodiment may further include following steps after the electronic apparatus 100 enters the glove mode.

In step S116, touch detection is performed with the touch sensor 102 to generate a second touch signal S2. The second touch signal S2 has a fourth amplitude A4.

In step S118, it is determined whether the fourth amplitude A4 reaches a saturation value V5. Step S120 is performed when the fourth amplitude A4 is greater than the saturation value V5, or else step S122 is performed.

In step S120, the signal gain of the signal amplifying unit 106 is reduced.

In step S122, the signal gain of the signal amplifying unit 106 is maintained.

Figure 10:
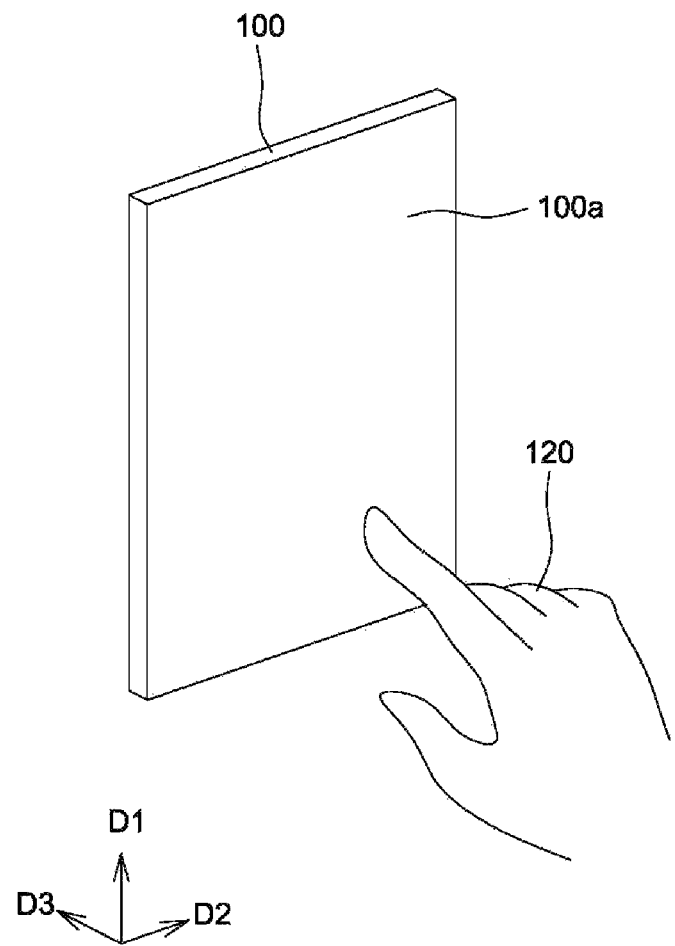
FIG. 10 is a schematic diagram of a second touch object touching an electronic apparatus of the present invention.
Figure 11:
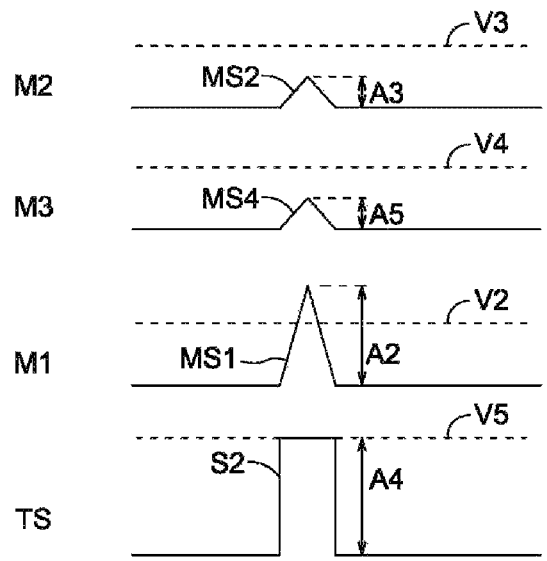
FIG. 11 is a schematic diagram of a touch signal of conditions in step S120 according to the first embodiment of the present invention

In the description below, for example, a touch object 120 exemplified by a bare user finger is given to explain the present invention. Refer to FIG. 10 and FIG. 11 as well as FIG. 1 and FIG. 3. Step S116 is performed after step S114. In step S116, the user touches the electronic apparatus 100 once with the second touch object 120, and the electronic apparatus 100 accordingly generates a second touch signal S2 with the touch sensor 102. Further, the motion sensor 104 may generate a first motion signal MS1 in the third direction D3, a second motion signal MS2 in the first direction D1, and a fourth motion signal MS4 in the second direction D2.

In step S118, the second touch signal S2 is transmitted to the controller 110, so as to determine whether the fourth amplitude A4 reaches a predetermined saturation value V5 through the controller 110. The saturation value V5 is maximum amplitude that can be accepted by the controller 110.

According to the determination result of the controller 110, when the fourth amplitude A4 reaches the saturation value V5, step S120 is performed. In the above situation, it means that the second touch signal S2 sent from the touch sensor 102 is an over-saturated signal, such that the controller 110 cannot analyze a digital code corresponding to the second touch signal S2 and is thus incapable of determining the position of the second touch object 120. For example, when the second touch object 120 is a user bare finger or another object that generates a high sensitivity upon the touch sensor 102, the fourth amplitude A4 of the second touch signal S2 reaches the saturation value V5, such that the electronic apparatus 100 is incapable of determining the position of the second touch object 120.

Figure 12:
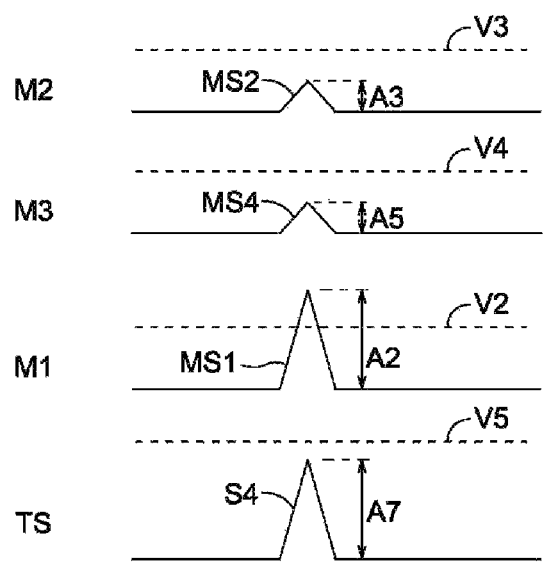
FIG. 12 is a schematic diagram of a touch signal generated after step S120 in a touch sensing method according to the first embodiment of the present invention.

When the electronic apparatus 100 is incapable of determining the position of the second touch object 120, step S120 is performed to reduce the signal gain of the signal amplifying unit 106 through the controller 110. Step S104 is performed to cause the electronic apparatus 100 to enter the normal mode from the glove mode. For example, the signal gain may be reduced back to the first signal gain from the second signal gain. Accordingly, when the second touch object 120 again touches the electronic apparatus 100, the touch sensor 102 may generate a fourth touch signal S4 having a seventh amplitude A7 smaller than the saturation value V5, as shown in FIG. 12. Thus, the controller 110 may recognize the fourth touch signal S4 generated from the second touch object 120 touching the touch sensor 102 to further determine that the second touch object 120 is a bare user finger, and may normally detect the position of the second touch object 120.

In another embodiment, step S118 may further selectively include determining whether the second amplitude A2 is greater than the second predetermined value V2. Thus, the electronic apparatus 100 determines that, under the conditions that the fourth amplitude A4 reaches the saturation value V5 and the second amplitude A2 is greater than the second predetermined value V2, the second touch object 120 is a bare user finger. Step S120 is then performed. As such, the controller 110 may first determine that the fourth amplitude A4 reaches the saturation value V5, and still learns the motion of a touch event of the second touch object 120 through the value of the second amplitude A2.

In another embodiment, step S118 may further selectively include determining whether the second amplitude A2 is greater than the second predetermined value V2, determining whether the third amplitude A3 is smaller than a third predetermined value V3, and determining whether a fifth amplitude A5 is smaller than a predetermined fourth value V4. As such, apart from learning whether a motion of a touch event of the second touch object 120 is present through the value of the second amplitude A2, the electronic apparatus 100 is prevented from giving a misjudgment when motion is present in all of the first direction D1, the second direction D2 and the third direction D3. Preferably, step S118 may further selectively include determining whether the third amplitude A3 and the fifth amplitude A5 are smaller than the second amplitude A2.

According to the determination result of the controller 110, when the fourth amplitude A4 does not reach the saturation value V5, step S122 is performed. More specifically, when the electronic apparatus 100 determines that the fourth amplitude A4 is smaller than the saturation value V5, the electronic apparatus 100 may detect the position of the second touch object 120, and hence determines that the second touch object 120 is a user finger wearing a glove, for example. Thus, in step S122, the controller 120 maintains the signal gain of the signal amplifying unit 106, and then performs step S114 in which the electronic apparatus 100 is kept in the glove mode. More specifically, the signal gain is maintained at the second signal gain, so that the controller 110 may recognize the touch signal generated from a user finger wearing a glove touching the touch sensor 120.

The touch sensing method of the present invention is not limited to the above embodiments. Other embodiments or variations of the present invention are further disclosed below. For the sake of simplicity and to emphasize differences between the embodiments or the variations, the same elements are represented by the same denotations, and such repeated details are omitted herein.

Figure 13:
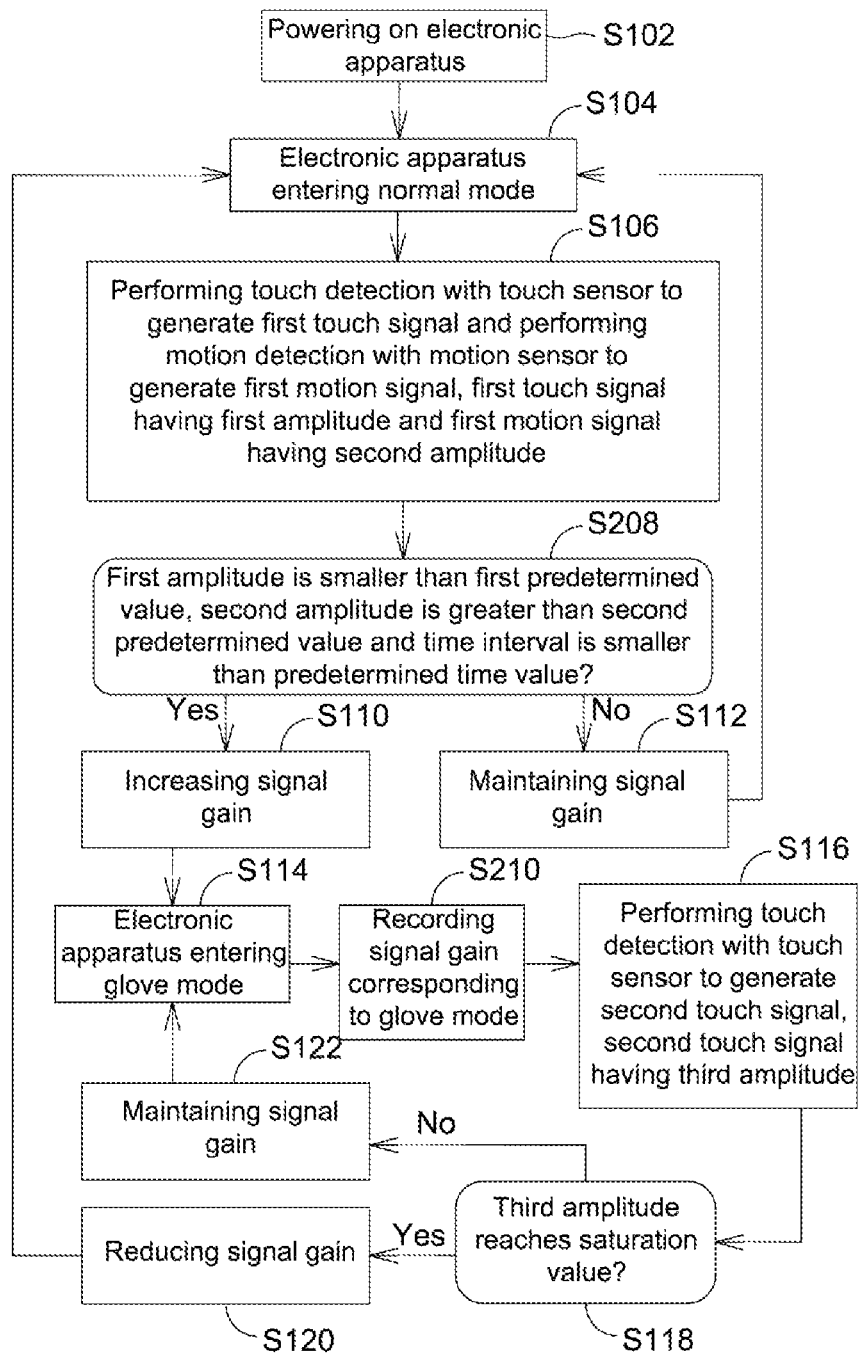
FIG. 13 is a flowchart of a touch sensing method of an electronic apparatus according to a second embodiment of the present invention.

Refer to FIG. 13 as well as FIG. 1 and FIG. 5. FIG. 13 is a flowchart of a touch sensing method according to a second embodiment of the present invention. As shown in FIG. 13, compared to the first embodiment, in the embodiment, step S208 for determining a first amplitude and a second embodiment are different from step S108 in the first embodiment, and further includes determining whether a second time interval T2 between the first motion signal MS1 and the third motion signal MS3 is smaller than a predetermined time value. In the embodiment, when the first amplitude A1 is smaller than the first predetermined value V1, the second amplitude A2 is greater than the second predetermined value V2, and the second time interval T2 is smaller than the predetermined time value, step S110 is performed, or else step S112 is performed.

In the embodiment, between step S114 and step S116, the touch sensing method of the embodiment further includes step S210. In step S210, the signal gain corresponding to the glove mode is recorded, i.e., the increased second signal gain, so as to facilitate the electronic apparatus 100 to convert between different modes.

In conclusion, in the touch sensing method of the present invention, the electronic apparatus simultaneously employs a touch sensor and a motion sensor to determine whether a touch object is a bare finger or a finger wearing a glove, so that the electronic apparatus may adjust the signal gain of the signal amplifying unit 106 for different touch objects. Thus, when the electronic apparatus is incapable of detecting a finger wearing a glove, the electronic apparatus may increase the signal gain; when the electronic apparatus is incapable of detecting a bare finger, the electronic apparatus may reduce the signal gain, thereby eliminating the inconvenience of having to remove the glove for a user. Further, the present invention is not limited to two different touch objects. For example, a plurality of sets of amplification gains and sensing behaviors may be disposed for the electronic apparatus to further recognize multiple touch objects or multiple touch scenarios.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A touch sensing method of an electronic apparatus, the electronic apparatus comprising a touch sensor and a motion sensor, the touch sensing method comprising:
    performing touch detection with the touch sensor to generate a first touch signal, and performing motion detection with the motion sensor to generate a first motion signal, the first touch signal having a first amplitude, the first motion signal having a second amplitude;
    determining whether the first amplitude is smaller than a first predetermined value, and determining whether the second amplitude is greater than a second predetermined value; and
    when the first amplitude is smaller than the first predetermined value and the second amplitude is greater than the second predetermined value, increasing a signal gain corresponding to the first touch signal,
    wherein the electronic apparatus comprises a touch surface, and the first motion signal is associated with a motion in a direction perpendicular to the touch surface, and
    the touch sensing method further comprising:
    detecting a motion in a direction parallel to the touch surface with the motion sensor to generate a second motion signal, the second motion signal having a third amplitude; and
    determining whether the third amplitude is smaller than a third predetermined value.

2. The touch sensing method according to claim 1, wherein in the step of increasing the signal gain of the first touch signal, when the first amplitude is smaller than the first predetermined value, the second amplitude is greater than the second predetermined value and the third amplitude is smaller than the third predetermined value, the signal gain is increased.

3. The touch sensing method according to claim 1, further comprising:
    determining whether the third amplitude is smaller than the second amplitude;
    wherein, in the step of increasing the signal gain of the first touch signal, when the first amplitude is smaller than the first predetermined value, the second amplitude is greater than the second predetermined value, the third amplitude is smaller than the third predetermined value, and the third amplitude is smaller than the second amplitude, the signal gain is increased.

4. The touch sensing method according to claim 1, further comprising:

performing another motion detection in the direction perpendicular to the touch surface with the motion sensor to generate a third motion signal, between the third motion signal and the first motion signal being a time interval; and determining whether the time interval is smaller than a predetermined time value;

wherein, in the step of increasing the signal gain of the first touch signal, when the first amplitude is smaller than the first predetermined value, the second amplitude is greater than the second predetermined value and the time interval is smaller than the predetermined time value, the signal gain is increased.

5. The touch sensing method according to claim 1, further comprising:

after the step of increasing the signal gain, performing touch detection with the touch sensor to generate a second touch signal, the second touch signal having a fourth amplitude;

determining whether the fourth amplitude reaches a saturation value; and when the fourth amplitude reaches the saturation value, reducing the signal gain.

6. A mode control method of an electronic apparatus, the electronic apparatus comprising a touch sensor and a motion sensor, the mode control method comprising:

performing touch detection with the touch sensor to generate a touch signal;

performing motion detection with the motion sensor to generate a motion signal; and switching to one of a first mode and a second mode according to the touch signal and the motion signal;

wherein, the first mode and the second mode correspond to a first signal gain and a second signal gain, respectively, and the first signal gain and the second signal gain are for adjusting the touch signal, wherein the touch signal has a first amplitude, the motion signal has a second amplitude, and the step of switching to one of the first mode and the second mode according to the touch signal and the motion signal comprises:

determining whether the first amplitude is smaller than a first predetermined value, and determining whether the second amplitude is greater than a second predetermined value; and when the first amplitude is smaller than the first predetermined value and the second amplitude is greater than second predetermined value, switching to the second mode;

wherein the second signal gain is greater than the first signal gain.

7. An electronic apparatus, comprising:

a touch sensor that performs touch detection to generate a first touch signal;

a motion sensor that performs motion detection to generate a first motion signal;

a signal amplifier, in communication with the touch sensor, that performs signal amplification on the first signal; and a controller, configured to adjust a signal gain of the amplifier according to an amplified first touch signal and the first motion signal, wherein the amplified first touch signal has a first amplitude, the first motion signal has a second amplitude, and the controller adjusts the signal gain according to a comparison result between the first amplitude and a first predetermined value and a comparison result between the second amplitude and a second predetermined value, the electronic apparatus further comprising a touch surface, wherein the motion signal is associated with a motion in a direction perpendicular to the touch surface, wherein the motion sensor further detects a motion in a direction parallel to the touch surface to generate a second motion signal, the second motion signal has a third amplitude, and the controller adjusts the signal gain according to the comparison result between the first amplitude and the first predetermined value, the comparison result between the second amplitude and the second predetermined value and a comparison result between the third amplitude and a third predetermined value.

8. The electronic apparatus according to claim 7, wherein when the first amplitude is smaller than the first predetermined value, the second amplitude is greater than the second predetermined value and the third amplitude is smaller than the third predetermined value, the controller increases the signal gain.

9. The electronic apparatus according to claim 7, wherein the motion sensor further performs another motion detection and generates a third motion signal, between the third motion signal and the first motion signal is a time interval, and the controller adjusts the signal gain further according to a comparison result between the time interval and a predetermined time value.

* * * * *